United States Patent
Manes (10) Patent No.: US 11,682,929 B2
(45) Date of Patent: *Jun. 20, 2023

(54) CAR TO CAR WIRELESS POWER TRANSFER

(71) Applicant: OTIS ELEVATOR COMPANY, Farmington, CT (US)

(72) Inventor: Enrico Manes, Feeding Hills, MA (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 521 days.

This patent is subject to a terminal disclaimer.

(21) Appl. No.: 16/702,630

(22) Filed: Dec. 4, 2019

(65) Prior Publication Data

US 2020/0195060 A1    Jun. 18, 2020

Related U.S. Application Data

(60) Provisional application No. 62/779,507, filed on Dec. 14, 2018.

(51) Int. Cl.
*H02J 50/40* (2016.01)
*B66B 7/00* (2006.01)
(Continued)

(52) U.S. Cl.
CPC ............... *H02J 50/40* (2016.02); *B66B 7/00* (2013.01); *B66B 11/0226* (2013.01);
(Continued)

(58) Field of Classification Search
CPC .. B66B 5/00; B66B 1/00; B66B 11/00; B66B 19/00; B66B 13/00; B66B 3/00;
(Continued)

(56) References Cited

U.S. PATENT DOCUMENTS 9,837,860 B2   12/2017  McCarthy et al.
10,011,181 B2   7/2018  Dudar et al.
(Continued)

FOREIGN PATENT DOCUMENTS

CN   201689948 U   12/2010
CN   103915867 A    7/2014
(Continued)

OTHER PUBLICATIONS

Appunn et al. "Contactless Power Supply for Magnetically Levitated Elevator Systems", International Conference on Electrical Machines, Sep. 2-5, 2012, 15 Pages.
(Continued)

*Primary Examiner* — Elim Ortiz
(74) *Attorney, Agent, or Firm* — Cantor Colburn LLP (57) ABSTRACT

A wireless power transfer system for wirelessly powering a conveyance apparatus of a first conveyance system and a conveyance apparatus of a second conveyance system including: a wireless electrical power transceiver located along a surface of the conveyance apparatus of the first conveyance system, a wireless electrical power transceiver located along a surface of the conveyance apparatus of the second conveyance system, the surface of the conveyance apparatus of the second conveyance system being opposite of the surface of the conveyance apparatus of the first conveyance system, wherein the wireless electrical power transceiver of the first conveyance system is configured to wirelessly transfer electrical power to the wireless electrical power transceiver of the second conveyance system when the wireless electrical power transceiver of the first conveyance system and the wireless electrical power transceiver of the second conveyance system are located proximate to one another.

14 Claims, 5 Drawing Sheets

(51) Int. Cl.
  *H02J 50/10*   (2016.01)
  *B66B 11/02*   (2006.01)
  *H02J 50/90*   (2016.01)
  *H02J 50/00*   (2016.01)
  *H02J 50/23*   (2016.01)
  *B66B 11/00*   (2006.01)
  *H02J 50/50*   (2016.01)
  *B66B 1/30*    (2006.01)

(52) U.S. Cl.
  CPC .............. *H02J 50/00* (2016.02); *H02J 50/10* (2016.02); *H02J 50/90* (2016.02); *B66B 1/306* (2013.01); *B66B 11/00* (2013.01); *B66B 2201/30* (2013.01); *H02J 50/23* (2016.02); *H02J 50/50* (2016.02)

(58) Field of Classification Search
  CPC ....... B66B 7/00; B66B 2201/00; Y02B 50/00; H02J 50/00; H02J 50/40; H02J 50/50; H02J 50/10; H02J 50/12; H02J 50/20; H02J 50/23; H02J 50/80; H02J 50/90; H02J 50/70; B60L 50/00; H01M 2220/00
  USPC ........ 307/104; 187/212, 276, 285, 289, 293, 187/296, 297; 320/318, 108, 101, 109, 320/166, 128, 102, 140, 162, 163, 119, 320/145, 118, 126, 125, 149, 148
  See application file for complete search history.

(56) References Cited

U.S. PATENT DOCUMENTS

| 2016/0090275 A1 | 3/2016 | Piech et al. |
| 2017/0057780 A1 | 3/2017 | Nguyen et al. |
| 2017/0057789 A1 | 3/2017 | Witczak et al. |
| 2017/0057792 A1 | 3/2017 | Dwari et al. |

FOREIGN PATENT DOCUMENTS

| CN | 105000438 A | 10/2015 |
| CN | 105490342 A | 4/2016 |
| CN | 205265309 U | 5/2016 |
| CN | 105947823 A | 9/2016 |
| GB | 607860 | 9/1948 |
| JP | 2002037559 A | 2/2002 |
| JP | 2012246119 A | * 12/2012 |
| JP | 2012246119 A | 12/2012 |
| JP | 2013043762 A | 3/2013 |
| JP | 2013047137 A | * 3/2013 |
| JP | 2013047137 A | 3/2013 |
| JP | 2013049511 A | 3/2013 |
| JP | 2017137151 A | 8/2017 |
| JP | 2018162113 A | 10/2018 |
| KR | 100874438 B1 | 12/2008 |

OTHER PUBLICATIONS

P. L. Wang et al., "Modeling and Design Optimization of Contactless Sliding Transformer System for Ropeless Elevators", Applied Mechanics and Materials, vols. 416-417, pp. 264-269, 2013, Abstract Only.

First Office Action dated Nov. 30, 2020 for Application No. 201911278395.0; dated Nov. 30, 2020; 7 pages.

The Extended European Search Report for Application No. 19215388. 0-3666704; dated Jul. 15, 2020; 6 pages.

Third Office Action dated Dec. 9, 2021 for Application No. 201911278395.0; dated Dec. 9, 2021; 8 pages.

* cited by examiner

CAR TO CAR WIRELESS POWER TRANSFER

CROSS-REFERENCE TO RELATED APPLICATIONS

This application claims the benefit of U.S. Provisional Application No. 62/779,507 filed Dec. 14, 2018, which is incorporated herein by reference in its entirety.

BACKGROUND

The embodiments herein relate to the field of conveyance systems, and specifically to a method and apparatus for powering a conveyance system.

Conveyance systems, such as, for example, elevator systems, escalator systems, and moving walkways require electrical power for operation. Travelling cables typically connect an elevator car of the elevator system to a stationary power source to provide power to the elevator car. Travelling cables add expense, weight, and complexity to elevator car operation and installation, thus improved methods of powering elevator cars are desired.

BRIEF SUMMARY

According to an embodiment, a wireless power transfer system for wirelessly powering a conveyance apparatus of a first conveyance system and a conveyance apparatus of a second conveyance system is provided. The wireless power transfer system including: a wireless electrical power transceiver located along a surface of the conveyance apparatus of the first conveyance system, a wireless electrical power transceiver located along a surface of the conveyance apparatus of the second conveyance system, the surface of the conveyance apparatus of the second conveyance system being opposite of the surface of the conveyance apparatus of the first conveyance system, wherein the wireless electrical power transceiver of the first conveyance system is configured to wirelessly transfer electrical power to the wireless electrical power transceiver of the second conveyance system when the wireless electrical power transceiver of the first conveyance system and the wireless electrical power transceiver of the second conveyance system are located proximate to one another.

In addition to one or more of the features described herein, or as an alternative, further embodiments may include that the wireless electrical power transceiver of the first conveyance system and the wireless electrical power transceiver of the second conveyance system are in a facing spaced relationship when the wireless electrical power transceiver of the first conveyance system and the wireless electrical power transceiver of the second conveyance system are located at a first location.

In addition to one or more of the features described herein, or as an alternative, further embodiments may include that the first conveyance system is a first elevator system and the conveyance apparatus of the first conveyance system is an elevator car, and wherein the second conveyance system is a second elevator system and the conveyance apparatus of the second conveyance system is an elevator car.

In addition to one or more of the features described herein, or as an alternative, further embodiments may include: a wireless electrical power transmitter located in a second location along the first conveyance system opposite the surface of the conveyance apparatus of the first conveyance system and along the second conveyance system opposite the surface of the conveyance apparatus of the second conveyance system; wherein the wireless electrical power transmitter is configured to wirelessly transmit electrical power to the wireless electrical power transceiver of the first conveyance system when the wireless electrical power transceiver of the first conveyance system is located in the second location.

In addition to one or more of the features described herein, or as an alternative, further embodiments may include: a wireless electrical power transmitter located in a second location along the first conveyance system opposite the surface of the conveyance apparatus of the first conveyance system and along the second conveyance system opposite the surface of the conveyance apparatus of the second conveyance system, wherein the wireless electrical power transmitter is configured to wirelessly transmit electrical power to the wireless electrical power transceiver of the second conveyance system when the wireless electrical power transceiver of the second conveyance system is located in the first location.

In addition to one or more of the features described herein, or as an alternative, further embodiments may include: a first electrical coil of the wireless electrical power transmitter adjacent to the wall of the first conveyance system; and a rotational device configured to rotate the wireless electrical power transmitter and the first electrical coil towards the wireless electrical power transceiver of the first conveyance system or wireless electrical power transceiver of the second conveyance system.

In addition to one or more of the features described herein, or as an alternative, further embodiments may include: a first electrical coil of the wireless electrical power transmitter adjacent to the wall of the first conveyance system; and a second electrical coil of the wireless electrical power transmitter adjacent to the wall of the second conveyance system.

In addition to one or more of the features described herein, or as an alternative, further embodiments may include that the wireless electrical power transceiver of the first conveyance system and the wireless electrical power transmitter are in a facing spaced relationship defining a gap therebetween when the wireless electrical power transceiver is located at a second location.

In addition to one or more of the features described herein, or as an alternative, further embodiments may include that the wireless electrical power transceiver of the second conveyance system and the wireless electrical power transmitter are in a facing spaced relationship defining a gap therebetween when the wireless electrical power transceiver is located at a second location.

In addition to one or more of the features described herein, or as an alternative, further embodiments may include that the first elevator system includes an elevator shaft, and wherein the second elevator system includes an elevator shaft adjacent to the elevator shaft of the first elevator system.

According to a system including a first conveyance system and a second conveyance system is provided. The system including: a conveyance apparatus of the first conveyance system; a conveyance apparatus of the second conveyance system; and a wireless power transfer system for wirelessly powering the conveyance apparatus of the first conveyance system and the conveyance apparatus of the second conveyance system, the wireless power transfer system including: a wireless electrical power transceiver located along a surface of the conveyance apparatus of the first conveyance system, a wireless electrical power transceiver located along a surface of the conveyance apparatus of the second conveyance system, surface of the conveyance apparatus of the second conveyance system being opposite of the surface of the conveyance apparatus of the first conveyance system, wherein the wireless electrical power transceiver of the first conveyance system is configured to wirelessly transfer electrical power to the wireless electrical power transceiver of the second conveyance system when the wireless electrical power transceiver of the first conveyance system and the wireless electrical power transceiver of the second conveyance system are located at a first location.

In addition to one or more of the features described herein, or as an alternative, further embodiments may include that the wireless electrical power transceiver of the first conveyance system and the wireless electrical power transceiver of the second conveyance system are in a facing spaced relationship when the wireless electrical power transceiver of the first conveyance system and the wireless electrical power transceiver of the second conveyance system are located at a first location.

In addition to one or more of the features described herein, or as an alternative, further embodiments may include that the first conveyance system is a first elevator system and the conveyance apparatus of the first conveyance system is an elevator car, and wherein the second conveyance system is a second elevator system and the conveyance apparatus of the second conveyance system is an elevator car.

In addition to one or more of the features described herein, or as an alternative, further embodiments may include that the wireless power transfer system further includes: a wireless electrical power transmitter located in a second location along the first conveyance system opposite the surface of the conveyance apparatus of the first conveyance system and along the second conveyance system opposite the surface of the conveyance apparatus of the second conveyance system; wherein the wireless electrical power transmitter is configured to wirelessly transmit electrical power to the wireless electrical power transceiver of the first conveyance system when the wireless electrical power transceiver of the first conveyance system is located in the second location, and wherein the wireless electrical power transmitter is configured to wirelessly transmit electrical power to the wireless electrical power transceiver of the second conveyance system when the wireless electrical power transceiver of the second conveyance system is located in the first location.

In addition to one or more of the features described herein, or as an alternative, further embodiments may include that the wireless power transfer system further includes: a first electrical coil of the wireless electrical power transmitter adjacent to the wall of the first conveyance system; and a rotational device configured to rotate the wireless electrical power transmitter and the first electrical coil towards the wireless electrical power transceiver of the first conveyance system or wireless electrical power transceiver of the second conveyance system.

In addition to one or more of the features described herein, or as an alternative, further embodiments may include that the wireless power transfer system further includes: a first electrical coil of the wireless electrical power transmitter adjacent to the wall of the first conveyance system; and a second electrical coil of the wireless electrical power transmitter adjacent to the wall of the second conveyance system.

In addition to one or more of the features described herein, or as an alternative, further embodiments may include that the wireless electrical power transceiver of the first conveyance system and the wireless electrical power transmitter are in a facing spaced relationship defining a gap therebetween when the wireless electrical power transceiver is located at a second location.

In addition to one or more of the features described herein, or as an alternative, further embodiments may include that the wireless electrical power transceiver of the second conveyance system and the wireless electrical power transmitter are in a facing spaced relationship defining a gap therebetween when the wireless electrical power transceiver is located at a second location.

In addition to one or more of the features described herein, or as an alternative, further embodiments may include that the first elevator system includes an elevator shaft, and wherein the second elevator system includes an elevator shaft adjacent to the elevator shaft of the first elevator system.

According to another embodiment, a wireless power transfer system for wirelessly powering an elevator car of a first elevator shaft and an elevator car of a second elevator shaft is provided. The wireless power transfer system including: a wireless electrical power transceiver located along a surface of the elevator car of the first elevator shaft, a wireless electrical power transceiver located along a surface of the elevator car of the second elevator shaft, the surface of the elevator car of the second elevator shaft being opposite of the surface of the elevator car of the first elevator shaft, wherein the wireless electrical power transceiver of the first elevator shaft is configured to wirelessly transfer electrical power to the wireless electrical power transceiver of the second elevator shaft when the wireless electrical power transceiver of the first elevator shaft and the wireless electrical power transceiver of the second elevator shaft are located proximate to one another.

Technical effects of embodiments of the present disclosure include powering elevator cars of multiple different shafts of an elevator system wirelessly using a wireless power transceiver on another elevator.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
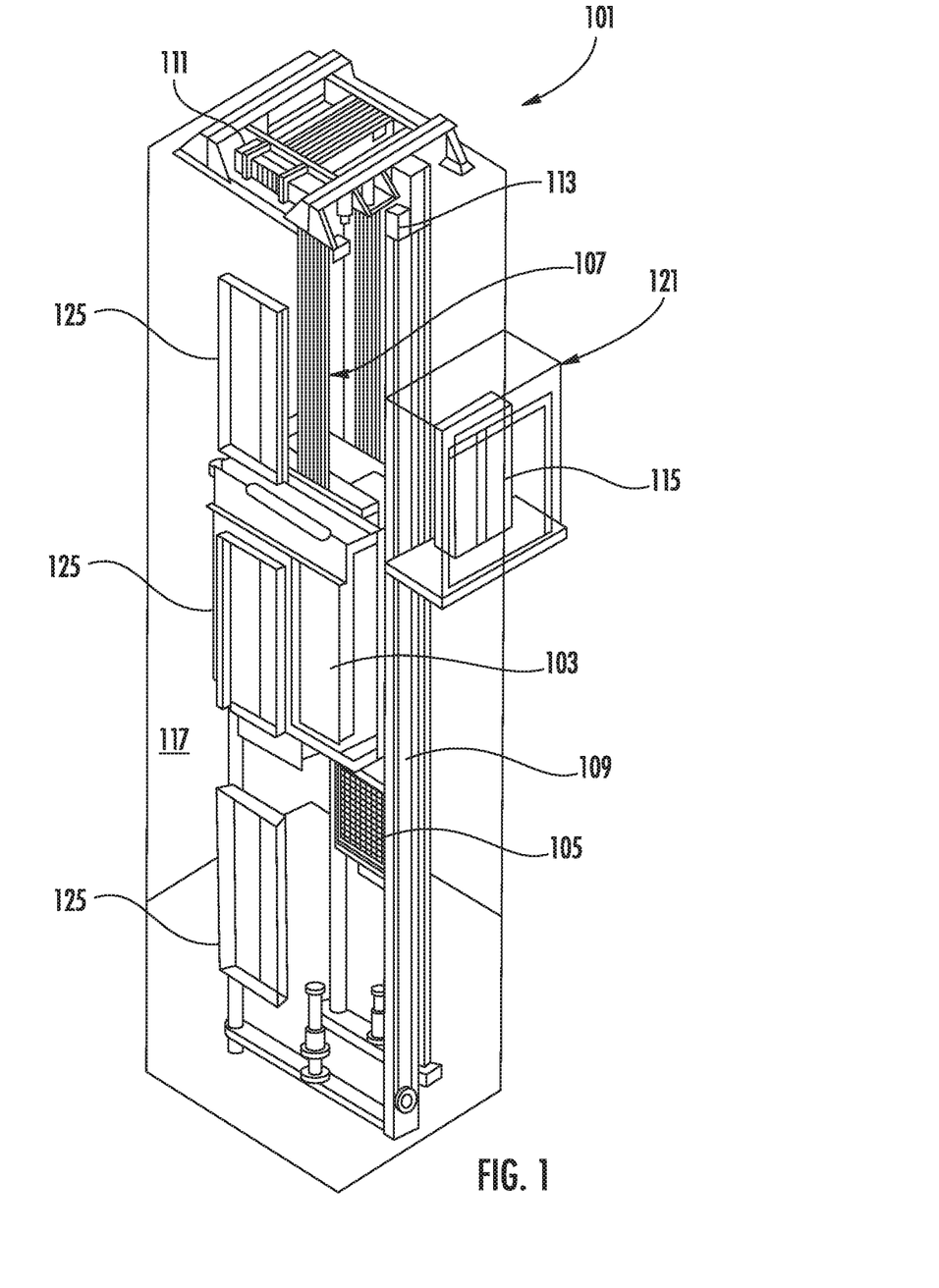
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

Figure 2:
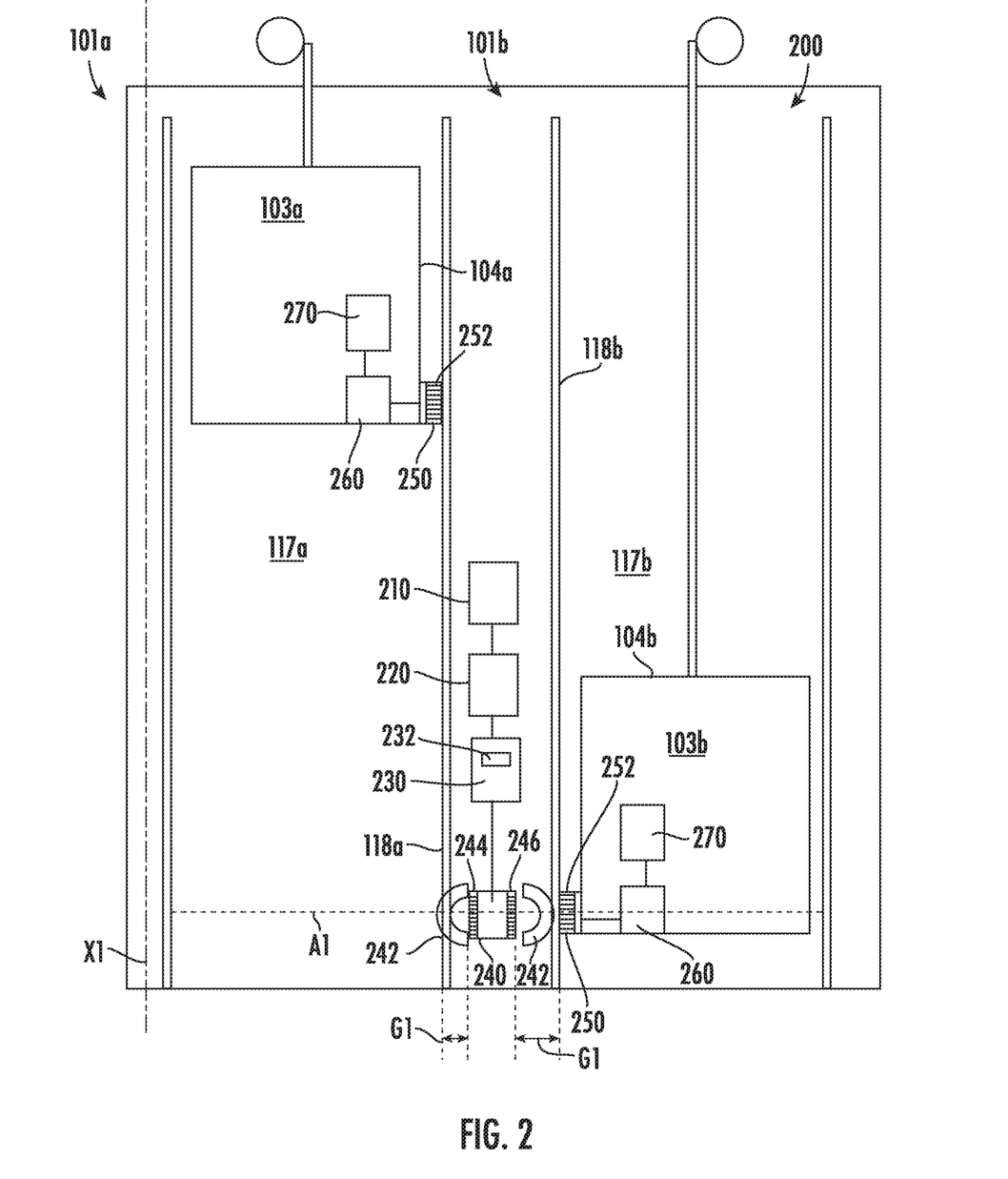
FIG. 2 is a schematic illustration of a wireless power transfer system for the elevator system of FIG. 1, in accordance with an embodiment of the disclosure.
Figure 3:
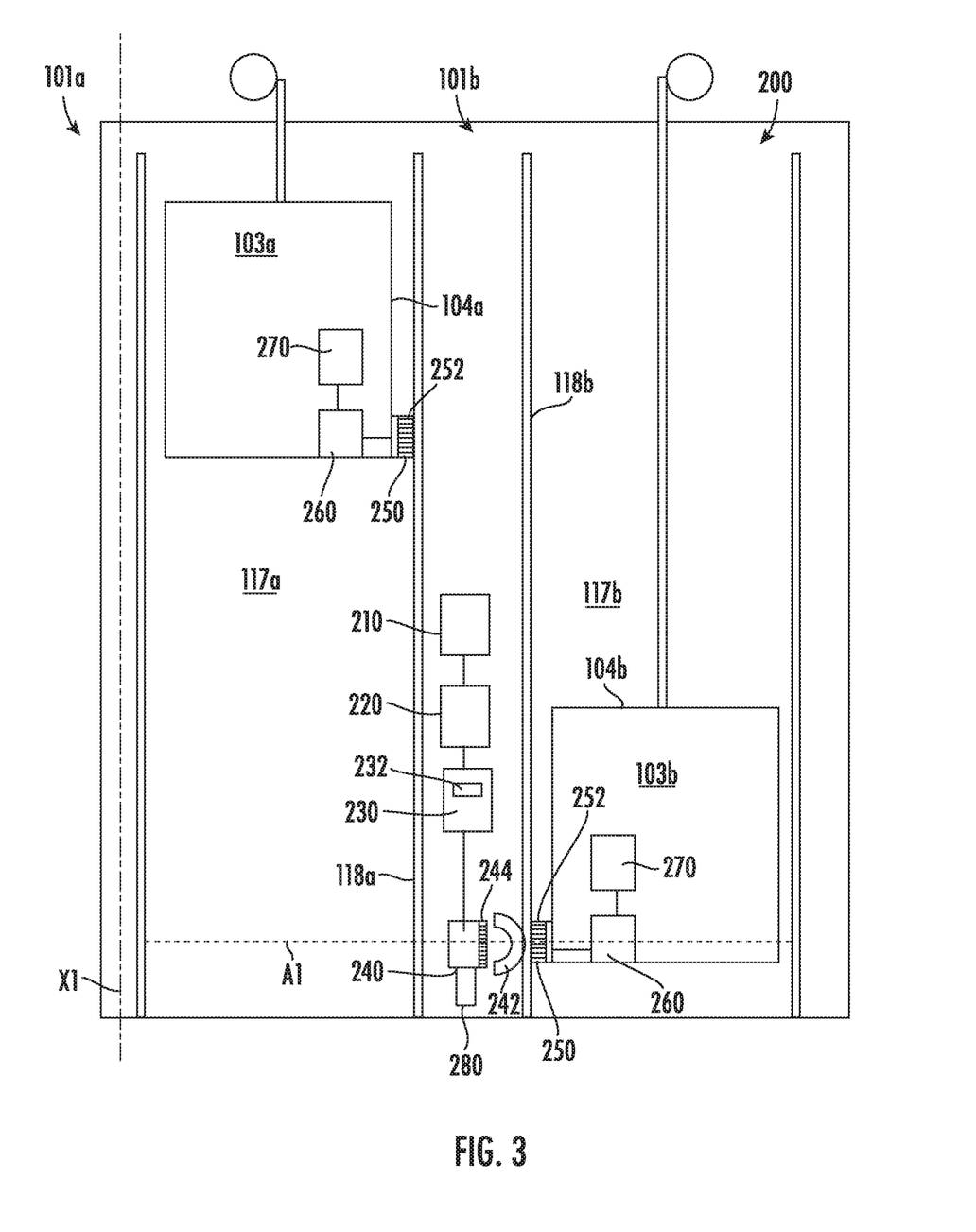
FIG. 3 is a schematic illustration of a wireless power transfer system for the elevator system of FIG. 1, in accordance with an embodiment of the disclosure.
Figure 4:
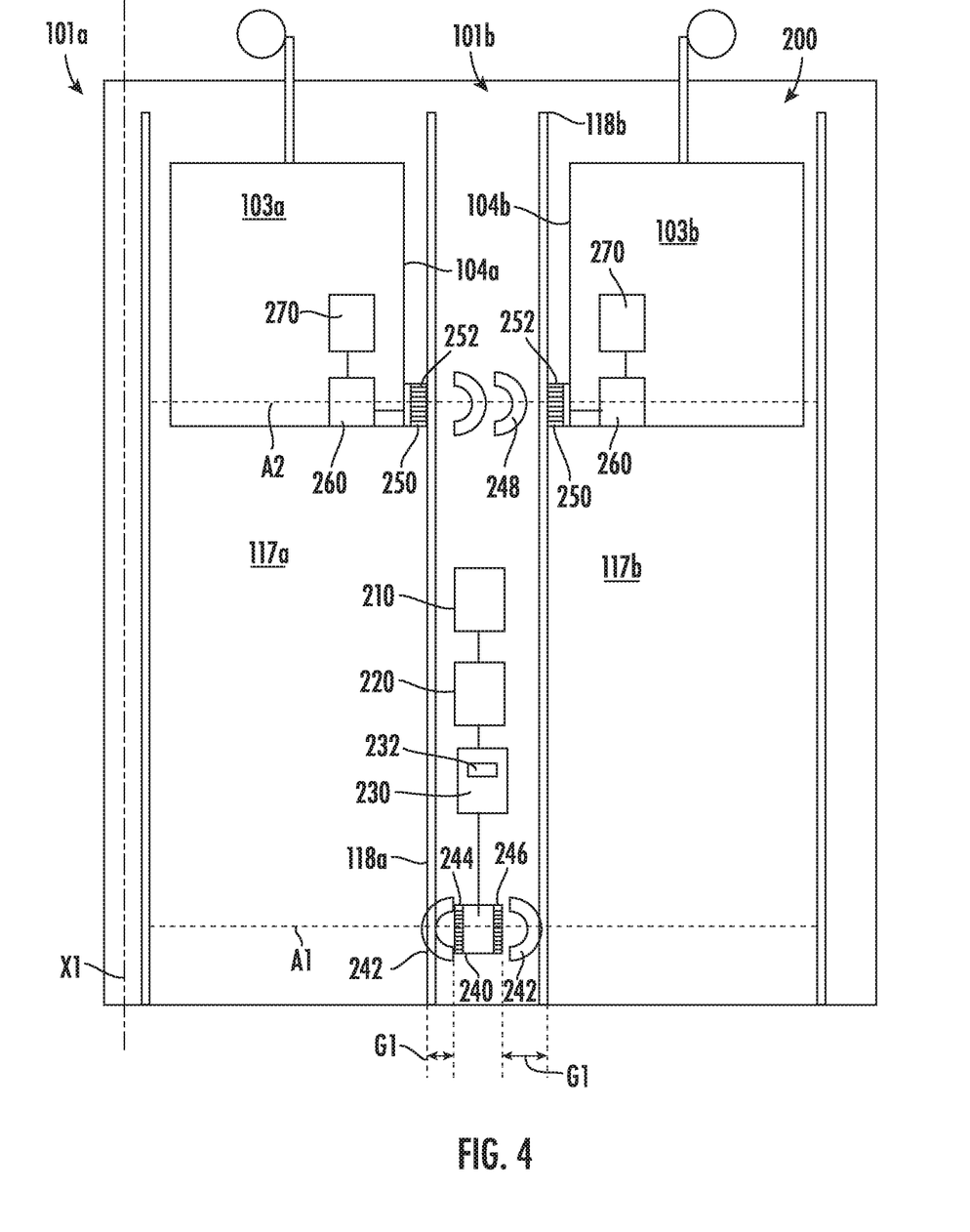
FIG. 4 is a schematic illustration of a wireless power transfer system for the elevator system of FIG. 1, in accordance with an embodiment of the disclosure.

Referring now to FIGS. 2-4 with continued reference to FIG. 1, a view of a wireless power transfer system 200 for use with one or more elevator systems 101 of FIG. 1 is illustrated, in accordance with an embodiment of the present disclosure. It should be appreciated that, although particular systems are separately defined in the schematic block diagrams, each or any of the systems may be otherwise combined or separated via hardware and/or software. The wireless power transfer system 200 may include a power source 210, an AC/DC power converter 220, a power management system 230, a wireless electrical power transmitter 240, a wireless electrical power transceiver 250, an energy storage device management system 260, and an energy storage device 270. An energy storage device 270 may not be required if energy harvesting is used. The wireless power transfer system 200 is configured to power first elevator car 103a of a first elevator system 101 in a first elevator shaft 117a and a second elevator car 103b of a second elevator system 101b in a second elevator shaft 117b adjacent to the first elevator shaft 117a.

The power source 210 may be a stationary power source, such as, for example electrical grid power, wind power, solar power, generator power, etc. The power source 210 may provide electrical power using alternating current (AC). The AC electrical power provided by the power source 210 may be three phase AC for higher power greater than about 3 kW. The AC/DC power converter 220 is configured to receive the AC electrical power from the power source 210 and convert the AC electrical power into DC electrical power. The AC/DC power converter 220 is electrically connected to the power source 210. The electrical connection between the AC/DC power converter 220 and the power source 210 may be hardwired.

The power management system 230 is electrically connected to the AC/DC power converter 220. The electrical connection between the power management system 230 and the AC/DC power converter 220 may be hardwired. The power management system 230 operates as a power controller to supply the power needs of the elevator car 103 proximate a second location A2 and a first location A1. The first location A1 may be a plane through the elevator shafts 117a, 117b about perpendicular to an axis X1 that runs parallel to the elevator shaft 117a, 117b. The power management system 230 controls switching, directing, or redirecting power to the elevator cars 103a, 103b, through a single wireless power transmitters 240 as needed to satisfy the power requirements of the elevator car 103. Switching, directing, and redirecting may readily be accomplished employing a bus control switching device 232 of the power management system 230. The bus control switching device 232 may include, but not be limited to, electromechanical and solid state semiconductor switching devices including relays, contactors, solid state contactors as well as semiconductor switching devices such as transistors, FETs, MOSFETS, IGBT's, thyristors, SCR's, and the like. In addition, to facilitate and implement the functionality of the power management system 230, the voltages and frequencies of the power supplied by the power source 210 may be adjusted by the bus control switching device 232. The wireless power transmitters 240 may later adjust the frequency of the electrical power to satisfy the needs of the elevator car 103. The wireless electrical power transmitter 240 may be intelligent enough to identify the resonant frequency and power flow between and adjust frequencies to meet requested power flow. The intelligence could also be with the wireless electrical power transmitter 240 in the sensing of the current being transmitted.

The wireless power transfer system 200 may include one or more wireless electrical power transmitters 240, as shown in FIG. 2. The electrical power transmitters 240 are electrically connected to the power management system 230. The electrical connection between the electrical power transmitter 240 and the power management system 230 may be hardwired. The wireless electrical power transmitter 240 may be located at a first locations A1 along a wall 118a of the first elevator shaft 117a and a wall 118b of the second elevator shaft 117. The wall 118a of the first elevator shaft 117a is adjacent to the wall 118b of the second elevator shaft 117b, as shown in FIGS. 2 and 3. The wireless electrical power transmitter 240 may be attached to the walls 118a, 118b, embedded in the walls 118a, 118b, within the walls 118a, 118b, or in any other desired arrangement.

The wireless electrical power transmitter 240 may include one or more electric coils 244, 246 and each electric coil 244, 246 may have a selected number of electrical coil windings configured to generate a magnetic field 242 when electrical power is run through the electrical coil 244, 246.

In an embodiment, the wireless electrical power transmitter 240 may be attached to a rotational device 280 and the electrical power transmitter 240 may include only a single first electrical coil 244, as shown in FIG. 3. The rotational device 280 is configured to rotate the first electrical coil 244 towards the wall 118a of the first elevator shaft 117a and then towards the wall 118b of the second elevator shaft 117b, thus allowing the first electrical coil 244 to wirelessly transmit electrical power to the wireless electrical power transceiver 250 of the elevator car 103a of the first elevator system 101a or the elevator car 103b of the second elevator system 101b. The rotational device 280 may be an electrical motor, hydraulic actuator, conveyer belt, or similar device known to one of skill in the art capable of rotating the wireless electrical power transmitter 240. In the example shown in FIG. 3, the rotational device 280 has rotated the wireless electrical power transmitter 240 towards the wall 118b of the second elevator shaft 117b as the elevator car 103a of the second elevator system 101 is located at the second location A2 awaiting wireless electrical power from the wireless electrical power transmitter 240.

It is understood that while only two elevator systems 101a, 101b are illustrated in FIG. 3. The rotational device 280 may allow the wireless electrical power transmitter 240 to wirelessly transmit electrical power to any number of elevator systems 101. For example, the wireless electrical power transmitter 240 may be located in the middle of where four corners of four elevator systems 101 meet and thus the rotational device 280 may move (e.g., rotate or translate) the first electrical coil 244 to each of the four corners of four elevator systems 101 to wirelessly transfer power to a wireless electrical power transceiver 250 within each of the four elevator system 101.

In another embodiment, the wireless electrical power transmitter 240 includes a dedicated electrical coil 244, 246 for each elevator system 101a, 101b being served, as shown in FIG. 2 rather than the shared electrical coil (e.g., the first electrical coil 244) of FIG. 3. In the example shown in FIG. 2, the wireless electrical power transmitter 240 includes a first electrical coil 244 adjacent to the wall 118a of the first elevator system 100a and a second electrical coil 246 adjacent to the wall 118b of the second elevator system 100b.

It is understood that while only two elevator systems 101a, 101b are illustrated in FIG. 2. The wireless electrical power transmitter 240 may include any number of electrical coils 244 to wirelessly transmit electrical power to any number of elevator systems 101. For example, the wireless electrical power transmitter 240 may be located in the middle of where four corners of four elevator systems 101 meet and thus the wireless electrical power transmitter 240 may include four electric coils aligned to each of the four corners of four elevator systems 101 to wirelessly transfer power to a wireless electrical power transceiver 250 within each of the four elevator system 101.

The elevator car 103a, 103b, of each elevator system 101a, 101b may include a wireless electrical power transceiver 250, as shown in FIG. 2. The wireless electrical wireless electrical power transceiver 250 may be located at different locations along a surface 104a, 104b of the elevator car 103a, 103b. The wireless electrical power transceivers 250 may be attached to the surface 104a, 104b of the elevator car 103a, 103b or embedded in the surface 104a, 104b of the elevator car 103a, 103b. The surface 104a, 104b of the elevator car 103a, 103b is located opposite the wall 118a, 118b of the elevator shaft 117a, 117b where the wireless electrical power transmitter 240 is located. Therefore, when the elevator car 103b, 103a and the wireless electrical power transceivers 250 are located at the second location A2, the wireless electrical power transceivers 250 and the wireless electrical power transmitter 240 at the second location A2 are in a facing spaced relationship and a gap G1 is formed therebetween. The gap G1 is formed between the wireless electrical power transceivers 250 of each elevator car 103a, 103b and the wireless electrical power transmitter 240 at the second location A2, as shown in FIG. 2. The gap G1 will also be present between the wireless electrical power transceivers 250 and the wireless electrical power transmitter 240, when the wireless electrical power transmitter 240 is rotated in FIG. 3 at the second location A2. The wireless electrical power transceivers 250 may include an electric coil 252 having a selected number of electrical coil windings configured to generate an electrical power in response to the magnetic field 242 when the wireless electrical power transceiver 250 is within the transmission range of the magnetic field 242 generated by the wireless electrical power transmitter 240.

The electrical power transceiver 250 is electrically connected to the energy storage device management system 260. The electrical connection between the electrical power transceiver 250 and the energy storage device management system 260 may be hardwired. The energy storage device management system 260 is configured to condition the electrical power received from the electrical power transceivers 250 and transfer the electrical power to the energy storage device 270 as needed. The energy storage device management system 154 monitors operation data of the energy storage device 270 including but not limited to the state of charge of the energy storage device 270, a state of health of the energy storage device 270, and a temperature of the energy storage device 270. Examples of the energy storage device 270 may include a battery system (e.g., a battery or bank of batteries), fuel cells, flow battery, and others devices capable of storing and outputting electric energy that may be DC. In one embodiment, the energy storage device 270 may store potential energy rather than electrical energy and that potential energy may be utilized to create electrical energy for the elevator car 103a, 130b. The energy storage device 270 may include a battery system, which may employ multiple batteries organized into battery banks. The energy storage device 270 is electrically connected to the elevator car 103a, 103b. The electrical connection between the energy storage device 270 and the elevator car 103a, 103b may be hardwired. The energy storage device 270 may power lighting inside the elevator car 103, fans, an emergency phone, climate controls, communication system, and/or the operating panel of the elevator car 103. The operating panel of the elevator car 103 may consists of floor buttons, a door open button, a door close button, other similar buttons, or may be a touchscreen.

As shown in FIG. 4, the wireless electrical power transceiver 250 may also enable the transfer of electrical power from the elevator car 103a of the first elevator system 101a to the elevator car 103b of the second elevator system 101b. The wireless electrical power transceivers 250 may include one or more electric coils 252 and each electric coil 252 may have a selected number of electrical coil windings configured to generate a magnetic field 248 when electrical power is run through the electrical coil 252 from the energy storage device 270. The wireless electrical power transceiver 250 of the first elevator system 101a may run electrical power through its electric coils 252 to generate a magnetic field 248 and transfer electrical power to the wireless electrical power transceiver 250 of the second elevator system 101b when each elevator car 103a, 103b is located at the first location A1. The magnetic field 248 generated by the electric coil 252 of the first elevator system 101a induces current to flow in the electric coil 252 of the second elevator system 101b, thus generating electrical power in response to the magnetic field 248.

Figure 5:
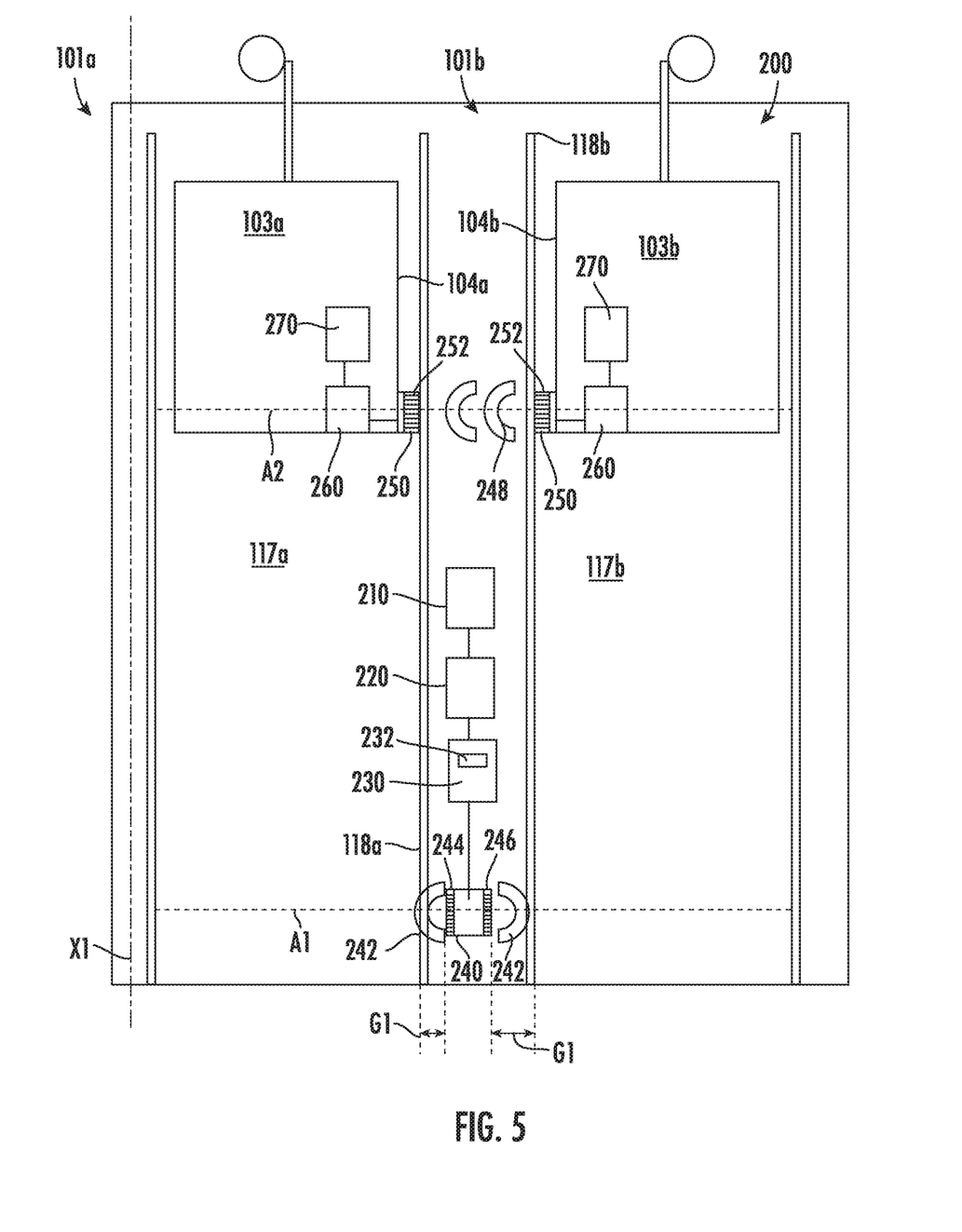
FIG. 5 is a schematic illustration of a wireless power transfer system for the elevator system of FIG. 1, in accordance with an embodiment of the disclosure.

As shown in FIG. 5, the wireless electrical power transceiver 250 may also enable the transfer of electrical power from the elevator car 103b of the second elevator system 101b to the elevator car 103a of the first elevator system 101a. The wireless electrical power transceivers 250 may include one or more electric coils 252 and each electric coil 252 may have a selected number of electrical coil windings configured to generate a magnetic field 248 when electrical power is run through the electrical coil 252 from the energy storage device 270. The wireless electrical power transceiver 250 of the second elevator system 101b may run electrical power through its electric coils 252 to generate a magnetic field 248 and transfer electrical power to the wireless electrical power transceiver 250 of the first elevator system 101a when each elevator car 103a, 103b is located at the first location A1. The magnetic field 248 generated by the electric coil 252 of the second elevator system 101b induces current to flow in the electric coil 252 of the first elevator system 101a, thus generating electrical power in response to the magnetic field 248. It is understood that while the examples illustrated in FIGS. 2-5 show the wireless transfer of electrical power between two elevator cars, any number of elevator cars may be used with embodiments disclosed herein. In one non-limiting example, one elevator car may transfer wireless electrical power to three elevator cars if the elevator cars are organized in a square and the wireless electrical power transceiver 250 of each elevator car is located proximate the center of the square.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A wireless power transfer system for wirelessly powering a conveyance apparatus of a first conveyance system and a conveyance apparatus of a second conveyance system, the wireless power transfer system comprising:
a wireless electrical power transceiver located on a surface of the conveyance apparatus of the first conveyance system;
a wireless electrical power transceiver located on a surface of the conveyance apparatus of the second conveyance system, the surface of the conveyance apparatus of the second conveyance system being opposite of the surface of the conveyance apparatus of the first conveyance system,
wherein the first conveyance system is a first elevator system and the conveyance apparatus of the first conveyance system is an elevator car, and wherein the second conveyance system is a second elevator system and the conveyance apparatus of the second conveyance system is an elevator car,
wherein the wireless electrical power transceiver of the first conveyance system is configured to wirelessly transfer electrical power to the wireless electrical power transceiver of the second conveyance system when the wireless electrical power transceiver of the first conveyance system and the wireless electrical power transceiver of the second conveyance system are located proximate to one another at a first location;

a wireless electrical power transmitter located in a second location along the first conveyance system opposite the surface of the conveyance apparatus of the first conveyance system and along the second conveyance system opposite the surface of the conveyance apparatus of the second conveyance system;

wherein the wireless electrical power transmitter is configured to (i) wirelessly transmit electrical power to the wireless electrical power transceiver of the first conveyance system when the wireless electrical power transceiver of the first conveyance system is located in the second location and (ii) wirelessly transmit electrical power to the wireless electrical power transceiver of the second conveyance system when the wireless electrical power transceiver of the second conveyance system is located in the second location;

a first electrical coil of the wireless electrical power transmitter adjacent to a wall of the first conveyance system; and a rotational device configured to (i) rotate the wireless electrical power transmitter and the first electrical coil towards the wireless electrical power transceiver of the first conveyance system and (ii) rotate the wireless electrical power transmitter and the first electrical coil towards the wireless electrical power transceiver of the second conveyance system.

2. The wireless power transfer system of claim 1, wherein the wireless electrical power transceiver of the first conveyance system and the wireless electrical power transceiver of the second conveyance system are in a facing spaced relationship when the wireless electrical power transceiver of the first conveyance system and the wireless electrical power transceiver of the second conveyance system are located at the first location.

3. The wireless power transfer system of claim 1, further comprising:

the wireless electrical power transmitter located in the second location along the first conveyance system opposite the surface of the conveyance apparatus of the first conveyance system and along the second conveyance system opposite the surface of the conveyance apparatus of the second conveyance system, wherein the wireless electrical power transmitter is configured to wirelessly transmit electrical power to the wireless electrical power transceiver of the second conveyance system when the wireless electrical power transceiver of the second conveyance system moves to the first location.

4. The wireless power transfer system of claim 1, further comprising: a second electrical coil of the wireless electrical power transmitter adjacent to a wall of the second conveyance system.

5. The wireless power transfer system of claim 1, wherein the wireless electrical power transceiver of the first conveyance system and the wireless electrical power transmitter are in a facing spaced relationship defining a gap therebetween when the wireless electrical power transceiver of the first conveyance system is located at the second location.

6. The wireless power transfer system of claim 1, wherein the wireless electrical power transceiver of the second conveyance system and the wireless electrical power transmitter are in a facing spaced relationship defining a gap therebetween when the wireless electrical power transceiver of the second conveyance system is located at the second location.

7. The wireless power transfer system of claim 1, wherein the first elevator system includes an elevator shaft, and wherein the second elevator system includes an elevator shaft adjacent to the elevator shaft of the first elevator system.

8. A system including a first conveyance system and a second conveyance system, the system comprising:

a conveyance apparatus of the first conveyance system; a conveyance apparatus of the second conveyance system;

a wireless power transfer system for wirelessly powering the conveyance apparatus of the first conveyance system and the conveyance apparatus of the second conveyance system, the wireless power transfer system comprising:

a wireless electrical power transceiver located on a surface of the conveyance apparatus of the first conveyance system, a wireless electrical power transceiver located on a surface of the conveyance apparatus of the second conveyance system, surface of the conveyance apparatus of the second conveyance system being opposite of the surface of the conveyance apparatus of the first conveyance system, wherein the wireless electrical power transceiver of the first conveyance system is configured to wirelessly transfer electrical power to the wireless electrical power transceiver of the second conveyance system when the wireless electrical power transceiver of the first conveyance system and the wireless electrical power transceiver of the second conveyance system are located at a first location, wherein the first conveyance system is a first elevator system and the conveyance apparatus of the first conveyance system is an elevator car, and wherein the second conveyance system is a second elevator system and the conveyance apparatus of the second conveyance system is an elevator car;

a wireless electrical power transmitter located in a second location along the first conveyance system opposite the surface of the conveyance apparatus of the first conveyance system and along the second conveyance system opposite the surface of the conveyance apparatus of the second conveyance system;

wherein the wireless electrical power transmitter is configured to (i) wirelessly transmit electrical power to the wireless electrical power transceiver of the first conveyance system when the wireless electrical power transceiver of the first conveyance system is located in the second location and (ii) wirelessly transmit electrical power to the wireless electrical power transceiver of the second conveyance system when the wireless electrical power transceiver of the second conveyance system is located in the second location; wherein the wireless power transfer system further comprises:

a first electrical coil of the wireless electrical power transmitter adjacent to a wall of the first conveyance system; and a rotational device configured to (i) rotate the wireless electrical power transmitter and the first electrical coil towards the wireless electrical power transceiver of the first conveyance system and (ii) rotate the wireless electrical power transmitter and the first electrical coil towards the wireless electrical power transceiver of the second conveyance system.

9. The system of claim 8, wherein the wireless electrical power transceiver of the first conveyance system and the wireless electrical power transceiver of the second conveyance system are in a facing spaced relationship when the wireless electrical power transceiver of the first conveyance system and the wireless electrical power transceiver of the second conveyance system are located at first location.

10. The system of claim 8, wherein the wireless power transfer system further comprises: a second electrical coil of the wireless electrical power transmitter adjacent to a wall of the second conveyance system.

11. The system of claim 8, wherein the wireless electrical power transceiver of the first conveyance system and the wireless electrical power transmitter are in a facing spaced relationship defining a gap therebetween when the wireless electrical power transceiver of the first conveyance system is located at the second location.

12. The system of claim 8, wherein the wireless electrical power transceiver of the second conveyance system and the wireless electrical power transmitter are in a facing spaced relationship defining a gap therebetween when the wireless electrical power transceiver of the second conveyance system is located at the second location.

13. The system of claim 9, wherein the first elevator system includes an elevator shaft, and wherein the second elevator system includes an elevator shaft adjacent to the elevator shaft of the first elevator system.

14. A wireless power transfer system for wirelessly powering an elevator car of a first elevator shaft and an elevator car of a second elevator shaft, the wireless power transfer system comprising:
   a wireless electrical power transceiver located on a surface of the elevator car of the first elevator shaft,
   a wireless electrical power transceiver located on a surface of the elevator car of the second elevator shaft, the surface of the elevator car of the second elevator shaft being opposite of the surface of the elevator car of the first elevator shaft,
   wherein the wireless electrical power transceiver of the first elevator shaft is configured to wirelessly transfer electrical power to the wireless electrical power transceiver of the second elevator shaft when the wireless electrical power transceiver of the first elevator shaft and the wireless electrical power transceiver of the second elevator shaft are located proximate to one another at a first location;
   a wireless electrical power transmitter located in a second location along the first elevator shaft opposite the surface of the elevator car of the first elevator shaft and along the second elevator shaft opposite the surface of the elevator car of the second elevator shaft;
   wherein the wireless electrical power transmitter is configured to
   (i) wirelessly transmit electrical power to the wireless electrical power transceiver of the first elevator shaft when the wireless electrical power transceiver of the first elevator shaft is located in the second location and
   (ii) wirelessly transmit electrical power to the wireless electrical power transceiver of the second elevator shaft when the wireless electrical power transceiver of the second elevator shaft is located in the second location;
   a first electrical coil of the wireless electrical power transmitter adjacent to a wall of the first elevator shaft; and
   a rotational device configured to (i) rotate the wireless electrical power transmitter and the first electrical coil towards the wireless electrical power transceiver of the first elevator shaft and (ii) rotate the wireless electrical power transmitter and the first electrical coil towards the wireless electrical power transceiver of the second elevator shaft.

* * * * *